W. J. A. LONDON.
SPEED GOVERNOR.
APPLICATION FILED DEC. 4, 1911.
1,074,879.
Patented Oct. 7, 1913.
2 SHEETS—SHEET 1.
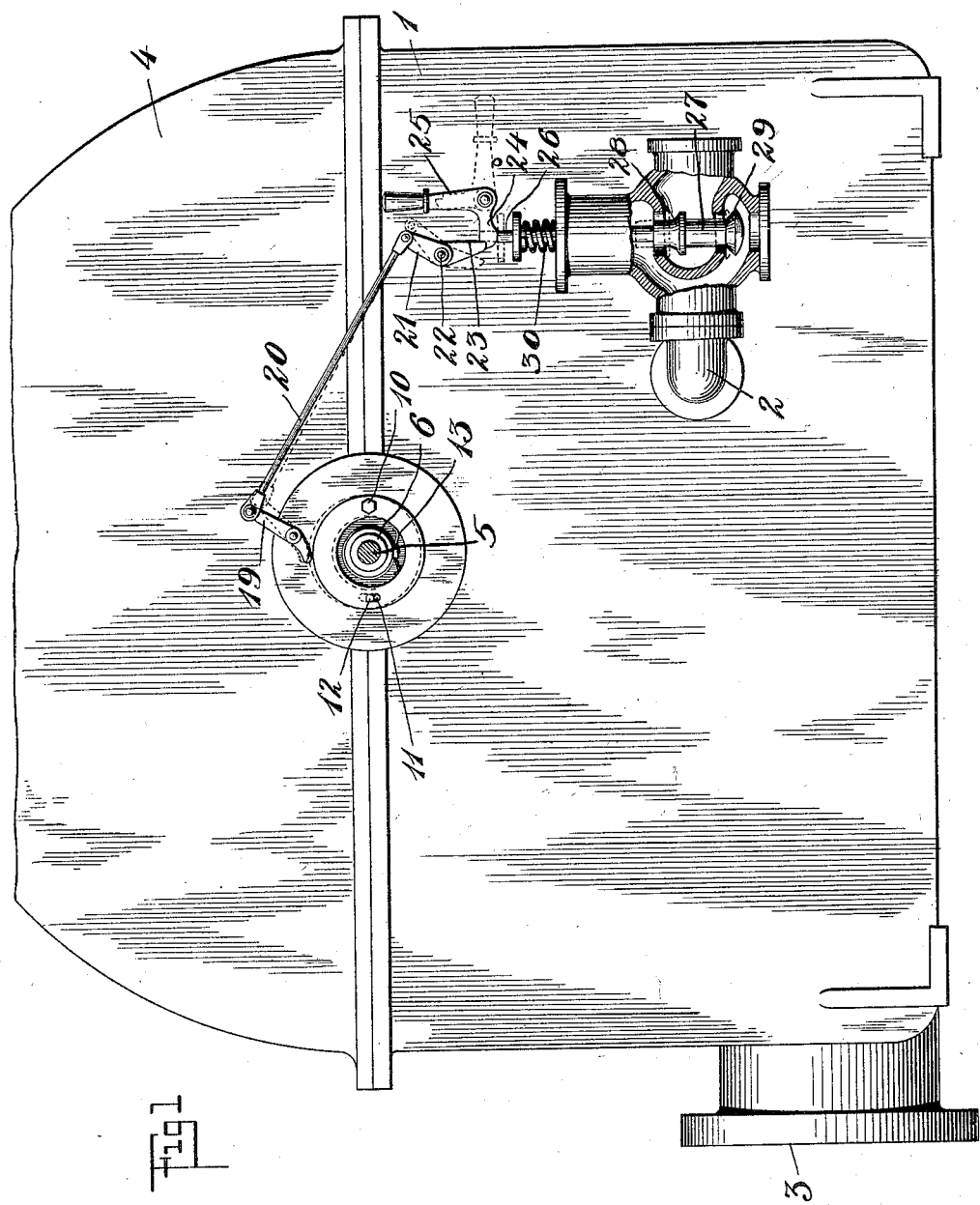
WITNESSES
INVENTOR
W. J. A. London
BY
ATTORNEYS W. J. A. LONDON.
SPEED GOVERNOR.
APPLICATION FILED DEC. 4, 1911.
1,074,879.
Patented Oct. 7, 1913.
2 SHEETS—SHEET 2.
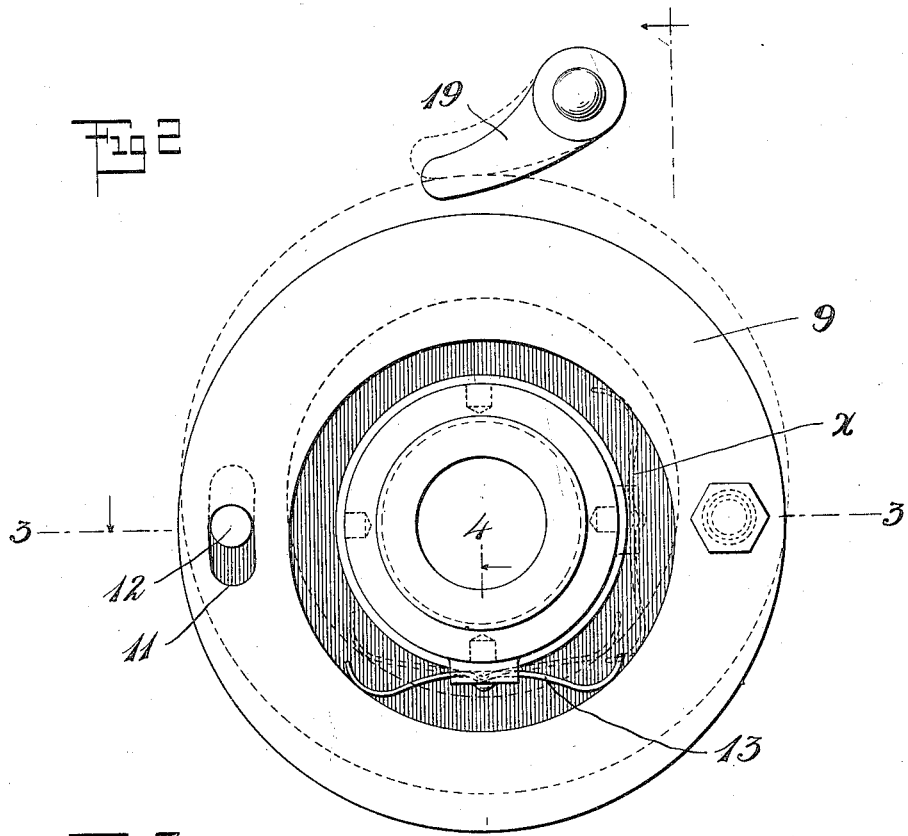
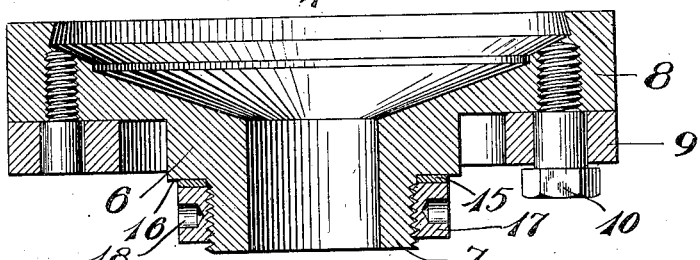
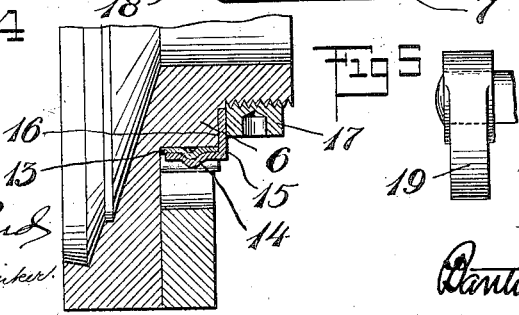
WITNESSES
INVENTOR
W.J.A. London
BY
ATTORNEYS

UNITED STATES PATENT OFFICE.

WILLIAM J. A. LONDON, OF HARTFORD, CONNECTICUT, ASSIGNOR TO THE TERRY STEAM TURBINE COMPANY, OF HARTFORD, CONNECTICUT, A CORPORATION OF CONNECTICUT.

SPEED-GOVERNOR.

1,074,879.  Specification of Letters Patent.  Patented Oct. 7, 1913.

Application filed December 4, 1911.  Serial No. 663,713.

*To all whom it may concern:*

Be it known that I, WILLIAM J. A. LONDON, a citizen of the United States, residing at Hartford, county of Hartford, State of Connecticut, have invented certain new and useful Improvements in Speed-Governors, of which the following is a full, clear, and exact description.

My invention relates to a speed governor, and is concerned with a device of this character which is particularly, though not exclusively, adapted for use with a steam turbine.

The invention has for its object to provide a device of this character of compact and economical construction, and which is not liable to get out of repair.

A further object is that the governor shall act positively and quickly when the predetermined speed is reached.

With these and other objects in view, the invention consists in a construction and arrangement of parts, the preferred embodiment of which is illustrated in the accompanying drawing in which, Figure 1 is a side elevation of a steam turbine having my invention attached thereto, parts being in section for clear illustration. Fig. 2 is an enlarged view of the governor mechanism. Fig. 3 is a transverse section on the line 3—3, Fig. 2. Fig. 4 is a view on the line 4—4, Fig. 2, and Fig. 5 is an edge view of the tappet arm of the governor mechanism.

In the embodiment of my invention herein selected for illustration, 1 indicates a steam turbine casing having a steam inlet 2 and an exhaust 3, which casing is provided with an upper or cover section 4. Within suitable bearings in the casing is journaled a rotor shaft 5 upon which is suitably secured a collar 6 comprising a hub 7 which fits closely to the shaft and a flange 8 upon which is mounted what may be termed an eccentric governor ring 9. The governor ring is pivoted on this flange 8 at 10 and is provided at its opposite side with a slot 11 taking over a stud 12 carried by the flange. The governor ring 9 is made heavier upon one side than upon the other. For example, the upper portion of the ring here shown is of greater thickness than the lower portion. This is plainly indicated in Figs. 1 and 2. Interposed between the governor ring and the hub 7 is a spring 13 which serves to hold the governor ring substantially concentric with the center of the driving shaft. This spring may be mounted on the hub in any desired manner. As here shown it is secured beneath a lateral projection 14 of an annular ring-like member 15 which is clamped against a shoulder 16 of the hub by a nut 17, said nut having apertures 18 for the reception of a spanner wrench. Coöperating with this governor ring is any suitable regulating mechanism which is operated when the governor ring moves out of normal concentric position. One such regulating mechanism that may be used in this connection is the following: On the bearing of the shaft and adjacent the governor ring is pivoted a tappet arm 19, one end of which lies closely adjacent the governor ring, and the other end of which is connected by a link 20 with a rock arm 21 carried by a rocking spindle 22 projecting laterally from the turbine casing, said rocking spindle carrying a latch member 23 which engages the arm 24 and a bell crank controller lever 25. This arm 24 of the controller lever bears upon a valve stem 26 of a double acting valve 27 having valve faces 28 and 29 coöperating with corresponding valve seats, one leading to the inlet 2 while the second may lead, if desired, to a different inlet port in the same turbine casing or to that of a different turbine casing.

When the parts are in the position indicated in Fig. 1, it will be seen that the latch member 23 holds the valve in open position against the pressure of the spring 30 surrounding the valve stem, the parts having been placed in this position by manually operating the controller lever 25 and moving the latch arm 23 in engagement therewith.

When the speed of the turbine reaches a point which centrifugal force acting upon the eccentrically mounted and unequally balanced ring 9 causes the same to move outwardly as indicated in dotted outline Fig. 2, said ring will engage the tappet arm 19 through the connections therewith, trip the latch arm 23 from the controller lever and the valve stem, thereby permitting the spring 30 to close the valve, which may be again opened by manipulating the controller lever. In the operation of the governor ring under centrifugal force, as the heavier portion moves outwardly, the lighter portion moves inwardly, and consequently, when once started in operation, the action will be more or less quick or sudden; consequently, while the governor will not operate except at a predetermined speed of the shaft, when it does operate it will operate very quickly and positively.

In order to vary the maximum speed of the turbine, I provide for adjustment of the spring 13. For example, the holding nut 17 may be loosened and the ring 15 carrying the spring may be shifted to any desired point within the circumference of the governor ring. When the spring is in the full line position shown in Figs. 1 and 2, it is obvious that the spring will have its maximum effect; whereas, when shifted, for example, to the dotted line position, x, Fig. 2, it will have its minimum effect. The full line position is the maximum speed position; the dotted line position, the minimum speed position.

While I have herein described a particular embodiment of my invention, it should be understood that the same may be altered in detail and arrangement of parts within the scope of the appended claims.

What I claim is:

1. In a governor, the combination of a rotating power shaft, a governor ring surrounding said shaft and positively driven thereby and having a portion at one side of said shaft heavier than a portion at the opposite side thereof, means centering said governor ring relative to said shaft during normal rotation, means whereby the rotation of said shaft beyond a predetermined speed may cause said governor ring to move eccentrically of said shaft, a regulating mechanism operable by said eccentric movement of said governor ring, and means for varying the position of said centering means relative to said governor ring whereby said ring may be conditioned for eccentric movement at varying speeds of rotation of said power shaft.

2. In a governor, the combination of a rotating power shaft, a governor ring surrounding said shaft and positively driven thereby and having a portion at one side of said shaft heavier than a portion at the opposite side thereof, means at the lighter side thereof counteracting said heavier portion and centering said ring relative to said shaft during normal rotation, means whereby the rotation of said shaft beyond a predetermined speed may cause said governor ring to move eccentrically of said shaft, a regulating mechanism operable by the eccentric movement of said governor ring, and means for varying the position of said counteracting and centering means relative to said governor ring whereby said ring may be conditioned for eccentric movement at varying speeds of rotation of said power shaft.

3. In a governor, the combination of a rotating power shaft, a governor ring surrounding said shaft and positively driven thereby and having a portion at one side heavier than a portion at the opposite side, means whereby the rotation of said shaft beyond a predetermined speed may cause said governor ring to move relative to said shaft, a regulating mechanism operable by the relative movement of said governor ring, and means opposing the relative movement of said governor ring up to a predetermined speed of rotation and adjustable in position relative to the heavier side thereof whereby said governor ring may be conditioned for relative movement at varying speeds of rotation of said power shaft.

4. In a governor, the combination of a rotating shaft, a governor ring surrounding said shaft and positively driven thereby and having a portion at one side heavier than a portion at the opposite side, means whereby the rotation of said shaft beyond a predetermined speed may cause said governor ring to move relative to said shaft, a regulating mechanism operable by the relative movement of said governor ring, spring means engaging the governor ring at a side opposite its heavier portion and opposing the relative movement of said governor ring up to a predetermined speed of rotation, and means whereby said spring means may be adjusted relative to said heavier portion of said ring to thereby condition said governor ring for relative movement at varying speeds of rotation of said power shaft.

5. In a governor, the combination of a rotating power shaft, a part rotating with said shaft, a governor ring surrounding said shaft carried by said rotating part and having a limited movement relative thereto and to said shaft, said ring having a portion at one side of said shaft heavier than a portion at the opposite side, means whereby the rotation of said shaft beyond a predetermined speed may cause said governor ring to move relative to said shaft, a regulating mechanism operable by said relative movement of said governor ring, a spring engaging said governor ring at a side opposite its heavier portion and opposing the relative movement of said governor ring up to a predetermined speed of rotation of said power shaft, and means for adjusting said spring at different positions relative to the heavier portion of said governor ring whereby said ring may be conditioned for relative movement at varying speeds of rotation of said power shaft.

6. In a governor, the combination of a rotating power shaft, a collar fixed thereto and rotating therewith, a governor ring surrounding said shaft and pivoted to said collar upon one side of said shaft and having a loose connection with said collar at the opposite side of said shaft, said ring having a heavier portion at one side than at the other, means whereby the rotation of said shaft beyond a predetermined speed may cause said governor ring to move relative to said shaft, a regulating mechanism operable by such relative movement of the governor ring, a spring secured to and rotating with said collar and engaging said governor ring at a side opposite its heavier portion and opposing the relative movement of said governor ring up to a predetermined speed of rotation, and means for adjusting said spring annularly of said collar and relative to the heavier portion of said governor ring whereby said ring may be conditioned for relative movement at varying speeds of rotation of said power shaft.

WILLIAM J. A. LONDON.

Witnesses:
ROBERT C. ALLEN,
GEORGE R. TRIPP.